(12) United States Patent
Vukman

(10) Patent No.: US 8,886,366 B2
(45) Date of Patent: Nov. 11, 2014

(54) DEVICE AND METHOD TO ESTIMATE THE STATE OF A MOVING VEHICLE

(71) Applicant: CGS S.P.A. Compagnia Generale Per Lo Spazio, Milan (IT)

(72) Inventor: Igor Vukman, Milan (IT)

(73) Assignee: CGF S.p.A. Compagnia Generale per Lo Spazio, Milan (IT)

( * ) Notice: Subject to any disclaimer, the term of this patent is extended or adjusted under 35 U.S.C. 154(b) by 0 days.

(21) Appl. No.: 13/784,222

(22) Filed: Mar. 4, 2013

(65) Prior Publication Data

US 2014/0088790 A1     Mar. 27, 2014

Related U.S. Application Data

(63) Continuation of application No. PCT/IB2011/053858, filed on Sep. 2, 2011.

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| G01C 21/16 | (2006.01) |

(52) U.S. Cl.
CPC ............... *G06F 7/00* (2013.01); *G01C 21/165* (2013.01)
USPC ............... 701/1; 701/3; 701/4; 701/5; 701/6; 701/11

(58) Field of Classification Search
None
See application file for complete search history.

(56) References Cited

FOREIGN PATENT DOCUMENTS

WO     2008024772 A1     2/2008

OTHER PUBLICATIONS

Navigation for Planetary Approach and Landing Final Report. European Space Agency. Contract Reference: 15618/01/NL/FM. May 2006.
Li et al., Vision-aided inertial navigation for pinpoint planetary landing. Aerospace Science and Technology. 2007. vol. 11 :499-506.

*Primary Examiner* — Bhavesh V Amin
(74) *Attorney, Agent, or Firm* — Nilay J. Choksi; Smith & Hopen, P.A.

(57) ABSTRACT

Device and method to estimate the state of a moving vehicle overflying a certain terrain. The device comprises a camera oriented toward the terrain, an inertial measurement unit, a device for the processing of images and a "navigation filter". This filter uses an innovative method to obtain state estimates of the vehicle. Unlike the conventional art, only robust and flexible expressions are used here, producing accurate state estimates, with no possibility of divergence, with no need for initial state estimates or high computational power. The method calculates parameters describing geometrical relationships among points of the trajectory and others on the terrain. These parameters are combined with estimates of the accelerations to obtain estimates of the velocity at a given time and of the gravity acceleration vector. By integrating these estimates, velocity and position profiles are obtained. The state is expressed in a reference system fixed with respect to the terrain.

10 Claims, 5 Drawing Sheets

DEVICE AND METHOD TO ESTIMATE THE STATE OF A MOVING VEHICLE

CROSS-REFERENCE TO RELATED APPLICATIONS

This application is a continuation of PCT Application No. PCT/IB2011/053858, filed Sep. 2, 2011, which claims priority to Italian Application No. CS2011A000024, filed Sep. 2, 2011 and Italian Application No. CS2010A000012, filed Sep. 4, 2010.

TECHNICAL FIELD OF THE INVENTION

The invention concerns a device and a method for estimating the state of a vehicle overflying a certain terrain.

The main, although not exclusive, application considered here for said device and method is on board "lander" vehicles, which are vehicles used to land on celestial bodies such as Mars and the Moon, for purposes of space exploration. The vehicles considered must carry out a manoeuvre of braked descent leading to landing. This manoeuvre also requires, particularly, the identification of a landing site, without precise prior knowledge, such that obstacles or dangers for the vehicle itself, such as rocks or large boulders or excessive slopes are not present on it.

In order to realize a maneuver of this kind, these vehicles must be capable of estimating their own state autonomously and in real time.

The state of the vehicle comprises the following components: position, velocity, attitude and angular velocity.

The state estimating devices in the State of the Art, in this context, are typically composed of the following components:
A camera that produces an output of a sequence of images taken in successive moments, which show the terrain being flown over
An Inertial Measurement Unit (IMU), which produces the measurements of angular velocity and linear acceleration, in a reference system united with the vehicle
An Image Processing device which repeatedly carries out the following operations:
Receives incoming input of the images acquired;
Identifies on the images some points which have the characteristic of being easily "traceable" in the sequence of images;
Carries out the operation of "tracing" said points—in other words it determines their apparent movement;
Processes and supplies a series of "tracks", which describe this apparent movement in terms of sequences of line and column coordinates of the pixel tracks in the camera matrix (the precise definition of the output data of this device is given in section 1.1.).
A device called a "Navigation Filter", which produces the estimates of the state as a function of the measurements of the IMU and of the processed data of the image elaboration device.

The diagram shown in FIG. 1 summarizes as much as is set out above.

The Navigation Devices in the State of the Art typically use, inside the Navigation Filter, recursive filtering algorithms, based on the repeated execution of two basic steps; these steps are, essentially, the propagation of the estimated state and the updating of the estimated state based on the latest data input received. Said algorithms typically present various disadvantages (for example, the possibility of divergences in the error estimate, and a high computational cost).

The invention concerns an innovative Navigation Device, which has the same block diagram (at a high level) as the devices of this type in the State of the Art, but which uses—inside the "Navigation Filter" device—a different, and better performing, method of calculation.

In particular, instead of repeatedly updating the estimates of the state, a non-recursive closed expression is used to calculate explicitly the estimates of the state in an efficient, robust and precise way, using the data input supplied by the IMU and by the image processing device. This device does not have the disadvantages present, instead, in the State of the Art devices, and furthermore permits a significant increase in performance—in particular there is a significant increase in the accuracy and robustness of the estimates, and an important reduction in computational cost.

RELEVANT PRIOR ART

The Navigation Filters used inside the Navigation Device in the State of the Art (in the considered context) are generally based on an approach which follows the concept of the Kalman Filter or one of its variants (such as, for example the Extended Kalman Filter). The starting point for defining the algorithms used in these devices is, typically, the following two equations:
The equation of observation (or measurement), used to calculate the values measured, starting with the present state of the system (vehicle);
The equation of transition (or propagation) of the state, used to calculate the successive state of the vehicle starting from the present state and from the input to the system.

It is important to take into account the fact that, together with the estimated state, the algorithms often also calculate the uncertainty associated with the estimated state, typically expressed by the matrix of co-variance of the error of estimate.

The core of the estimating process typically consists in the repeated execution of a cycle with the two following basic steps:
Prediction: here the estimated state (and associated error) are propagated using the equation of transition
Updating: here the estimation of the state obtained in the preceding step is updated taking the last measurements into account; this is typically done by adding, to the estimate of the state, a "correction" which is obtained by multiplying the "innovation" (that is the difference between the effective measurements, and those which would have been obtained if the estimated state had been "true") with an opportune matrix of "gain". One method for obtaining this matrix can be the minimization of the expected value of the quadratic error of the estimate.

On an intuitive level, it is possible to say that the filters used in the devices that are State of the Art use an "indirect" method for obtaining the state of the vehicle, starting from the measurements: in substance, instead of using a closed expression which directly obtains the state of the vehicle based on the set of the measurements, the algorithms used repeatedly improve the estimate of the state, based on the last measurements received.

On the other hand the (Navigation) Device which is the subject of this invention uses, inside the Navigation Filter, a closed-form expression to obtain directly the state of the vehicle.

SPECIFIC DOCUMENTS REGARDING PRIOR ART

[D1] X. Sembúly et al, "Mars Sample Return: Optimizing the Descent and Soft Landing for an Autonomous Martian Lander"
[D2] "Navigation for Planetary Approach and Landing Final Report", European Space Agency, Contract Reference: 15618/01/NL/FM, May 2006.
[D3] WO 2008/024772 A1 (Univ Florida [US]; Kaiser Michael Kent [US], Gans Nicholas Raphael [US]) 28 Feb. 2008 (2008-02-28)
[D4] Li et al: "Vision-aided inertial navigation for pinpoint planetary landing", Aerospace Science and Technology, Elsevier Masson, FR, vol 11. no. 6, 19 Jul. 2007 (2007-07-19), pages 499-506, XP022158291, ISSN: 1270-9638, DOI: DOI: 10.1016/J.AST.2007.04.006

EVALUATION OF PRIOR ART

Typically, some of the disadvantages in the use of the State of the Art devices (such as, for example, the devices described in [D1], [D2], [D3] e [D4]) are the following:
- The considerable importance of the initial/preliminary estimates (in some cases it is fundamental to initially send this data to the filter for a correct functioning);
- The risk of divergence/instability of the filter, or of a high level of estimate error;
- The potential necessity of a long testing campaign to evaluate the effect of the errors of the input data on the output data errors;
- The limited capability of estimation of the local vertical direction, that is of the gravity vector (used in the reference system to express the estimate of the state);
- The potential necessity of a long process of calibration of the parameters of the filter;
- The potential necessity of an IMU of high precision;
- The elevated computational cost of execution in real time (in other words the calculating hardware of the Navigation Filter must be capable of carrying out a high number of operations per second).

THE TECHNICAL PROBLEM TO BE SOLVED, ADVANTAGEOUS EFFECTS OF THE INVENTION

The object of the considered invention is an innovative device for obtaining estimates of the state of the vehicle in real time.
This device does not have the disadvantages present in the State of the Art devices (listed above). In particular:
- It is not necessary to have initialization values;
- The Navigation Filter cannot diverge;
- It is very simple to estimate the errors on the output data based on the input data errors;
- The local vertical direction can be easily estimated (together with the estimate of the state);
- There are no significant parameters of the filter or other values that require a long calibration process;
- The algorithm of the Navigation Filter is robust with respect to the errors in the measurements of the IMU;
- The computational cost of the algorithm used in the filter is reduced—the reduction foreseen is typically of at least 10 times with respect to the solutions in the State of the Art.

Furthermore, there is also a significant increase in the accuracy of the estimate of the state, typically of at least 10 times.

Using this innovative Navigation Filter inside the device, it will be possible to obtain a considerable increase in the general performance of the function of estimation of the state, with respect to the present State of the Art. This increase in performance will also have positive repercussions on the other functions and systems of the lander. This could also lead to a reduction in costs and to engineering budgets at a systems level—for example, a reduction in computational loads, an increase in the reliability of the mission as a result of an increase in robustness, and a reduction in the propellant mass (for example as a result of the increase in precision of the estimate of the state, with a consequent reduction in the need for corrective maneuvers).

A DESCRIPTION OF AN EMBODIMENT OF THE INVENTION

Figure 1:
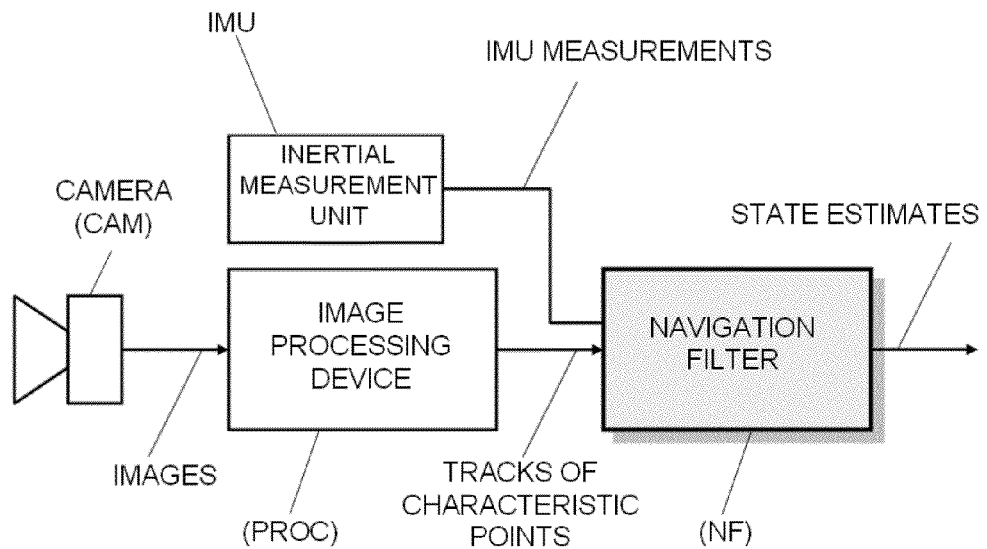
FIG. 1 is a diagram depicting the interaction of a camera, inertial measurement unit, image processing device, and navigation filter, according to an embodiment of the current invention.

The Principal Innovative Aspects of the Invention

The key innovative aspect of the invention is the method of calculation that is used inside the Navigation Filter to calculate the estimates of the state.

It is possible to say that, diversely to the State of the Art systems, where a general method of estimation (for example the Kalman Filter) is adapted for the particular case considered, here the method of estimation has been constructed "starting from scratch", highly optimized for the problem considered; the method of estimation uses only "closed" expressions, non-repetitive, efficient and robust.

Intuitively, comparing the problem of estimation of the state considered here with the problem of the search for the zeros of a cubic polynomial, the approach to the state of the art corresponds to the use of a repetitive numeric method, while the approach considered with the method proposed corresponds to the use of an explicit "analytic" solution (for example the Cardano method).

A DETAILED DESCRIPTION OF THE INVENTION

This section contains all the information necessary to construct the invention.

The section is structure in the following way:
Basic concepts and assumptions: here the definitions of the principal concepts and the assumptions used in the description are given;
A description of the function of the Filter: here the function of the Navigation Filter is rigorously defined in terms of input received and output produced;
A definition of the reference system for the estimates of state: here the definition of the reference system is supplied, in which the estimates of the state (produced by the Filter) are expressed;
A description of the algorithm: here the algorithm used in the Filter (QuickNav) is described, in terms of the operations that it carries out; this part is divided into:
  the pre-elaboration step: here some initial elaborations are described;
  the central step: here the way in which the key operations are carried out is described;
  the post-elaboration step: here the way in which the final output data are realized is described;
  additional information: here some further information regarding the algorithm is given.

1. Basic Concepts and Assumptions

In order to simplify the notation and the descriptions, a "continuous" (instead of "sampled") axis of the times will be considered. The temporal interval for which the movement of the vehicle (and the input and output data) is considered is indicated by I.

$$I = [t_0, t_1] \tag{1}$$

During this temporal interval, the vehicle will realize a certain trajectory in a region of space, above a part of the terrain.

It will be assumed that in this region of space, the gravity acceleration vector is constant.

Its direction defines the concept of "vertical".

Here a generic reference system (Reference Frame, RF) will be called "fixed" if it is fixed with respect to the terrain, during the temporal interval I.

Furthermore, it will be said that an RF has a "Vertical Z Axis" if its Z axis is parallel to the gravity vector, but has the opposite direction (and therefore gravity has null x and y components, and a negative z component).

Here the existence of a reference system denominated "Body Reference Frame" (BRF) is also assumed, that is fixed with respect to the vehicle; the IMU and the camera are also fixed with respect to the vehicle.

A vector expressed in the BRF will be indicated with an apex "B".

When there is no risk of ambiguity, the vectors expressed in a "Fixed" RF will have no apex.

Once a certain "Fixed" RF is defined, it can be used to express the dynamic state of the vehicle.

For each instant t in I, the dynamic state of the vehicle is defined by the following components:
  r(t): the position of the vehicle: the co-ordinates of the origin of the BRF, expressed in the chosen "Fixed" reference system;
  v(t): the velocity of the vehicle;
  A(t): the attitude of the vehicle: for simplicity of observation (but without loss of generality), it will be assumed that the attitude will be represented by a matrix of direction cosines. Consequently, the attitude matrix A contains the components of the three BRF versors, in the "Fixed" reference system chosen;
  ω(t): the angular velocity of the vehicle:

The acceleration of the vehicle, a(t), can be divided into two components:
  Gravity acceleration, g
  A "measurable" acceleration on board the IMU, $a_m(t)=a(t)-g$ The measurements carried out by the IMU are the following:
  The measurable acceleration, expressed in the BRF: $a_m^B(t)$
  The angular velocity, expressed in the BRF: $\omega^B(t)$.

To indicate a generic method for propagation of the matrix of the attitude from the temporal moment t=t' to t=t'', using ω(t) in t∈[t',t''] ⊂ I, the following expression will be used:

$$A(t'') = \int_{t'}^{t''} [\omega(t) \times] dt A(t') \tag{2}$$

Using these definitions, the following relations are obtained, for [t',t''] ⊂ I:

$$v(t'') = v(t') + \int_{t'}^{t''} a_m(t)dt + g(t'' - t') \tag{3}$$

$$r(t'') = r(t') + v(t')(t'' - t') + \int_{t'}^{t''} \int_{t'}^{t} a_m(\tau)d\tau dt + \frac{1}{2}g(t'' - t')^2$$

A general point on the surface of the celestial body considered will have the subscript "s".

The Concept of "Tracks" and Associated Concepts

Figure 2:
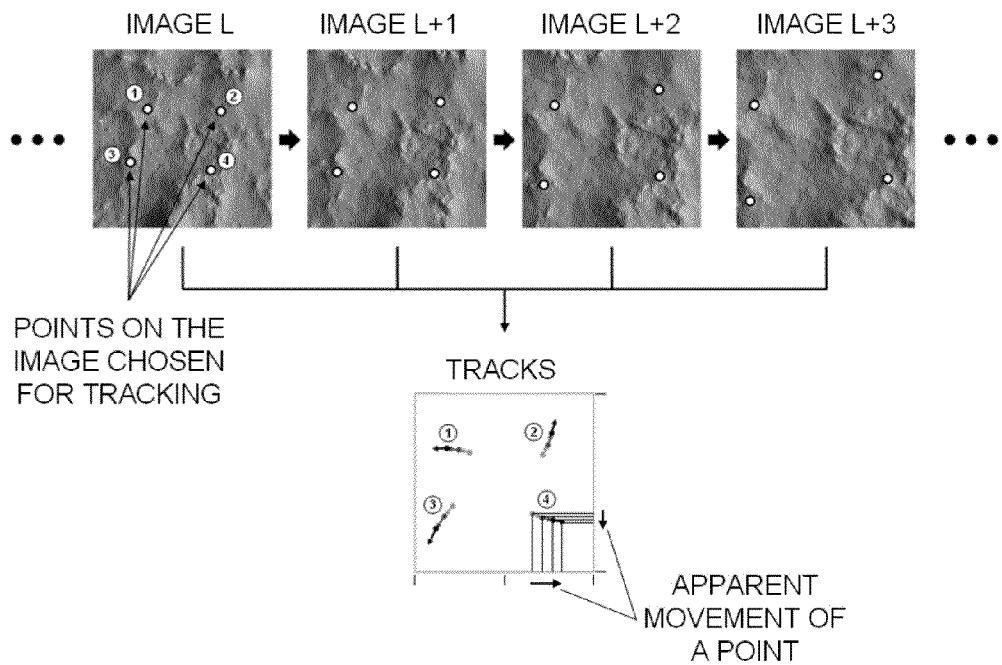
FIG. 2 depicts tracks of characteristic points of the terrain, where "particular" points are recognized in different images (taken in different moments) from the Image Elaboration Device. These points are tracked in their apparent movement on the plan of the image.

FIG. 2 shows the concept of tracks of characteristic points of the terrain; "particular" points are recognized in different images (taken in different moments) from the Image Elaboration Device; these points are followed, traced in their apparent movement on the plan of the image. These tracked points, together with the data from the IMU, are used by the Navigation Filter (see FIG. 2).

The concept of "track" (of characteristic points of the terrain) can be accurately defined in the following way:
  During the temporal period I, the Image Elaboration device has repeatedly carried out the two following types of operation:
    The extraction (or identification) of the characteristic points to be tracked;
    The tracking of the characteristic points;
  The first operation consists of the identification, on the acquired images, of certain particular points of the terrain (not previously known), which apparently have the characteristic of being easily traceable from one image to the successive one. The set of all the points ($r_{gi}$) extracted during the temporal interval I will be indicated by $R_g$:

$$R_g = (r_{g1}, \ldots r_{gN}) \tag{4}$$

Figure 3:
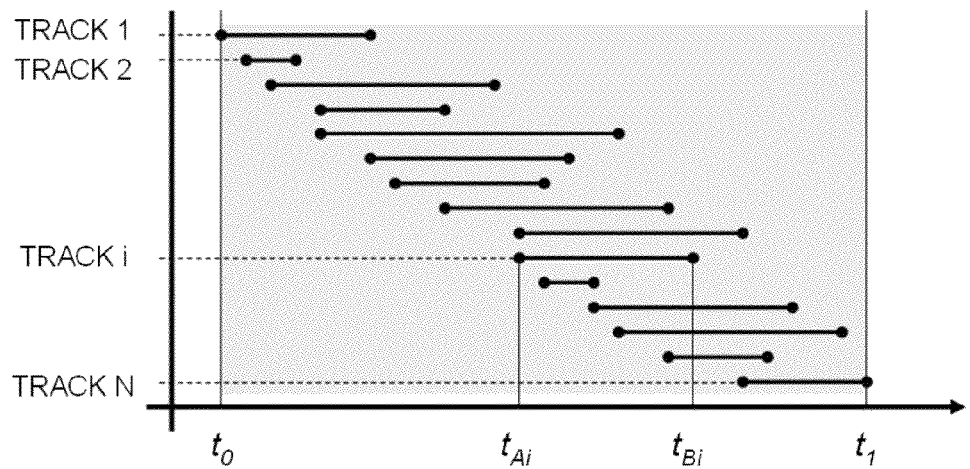
FIG. 3 is a graphical illustrating depicting an example of the temporal layout of the tracks according to an embodiment of the current invention.

In general, the identification of a point $r_{gi}$ has taken place at a certain instant in I; this instant, indicated by $t_{Ai}$ (for the i-nth point), indicates the "beginning" of the i-th track;

At a certain moment $t_{Bi} > t_{Ai}$, the tracking of the i-estimate point ends (for example because it has left the visible area); this moment indicates the "end" of the i-th track;

FIG. 3 shows an example of the temporal layout of the tracks:

The temporal interval (for a generic i-th track) $[t_{Ai}, t_{Bi}]$ will be called "Track Interval" (these intervals are, generally, different for different tracks);

During this temporal interval the Image Elaboration unit "follows" the point $r_{gi}$ supplying, for each t in $[t_{Ai}, t_{Bi}]$, its apparent position in the image, in terms of co-ordinates (lines and columns) of the pixels (for simplicity of notation, here a "continuous" temporal axis has been used, while in practice it will obviously be "sampled" with a certain frequency):

$$p_i(t) = (row_i(t), column_i(t)), \forall t \in [t_{Ai}, t_{Bi}] \quad (5)$$

The function $p_i(t)$ is called <<i-th track>>; the set of all the N tracks is indicated by P:

$$P = (p_1(\bullet), p_2(\bullet), \ldots p_N(\bullet)) \quad (6)$$

Where the notation $p_i(\bullet)$ indicates a function of the time (which has $[t_{Ai}, t_{Bi}]$ as the domain).

Consequently, it can be stated that three "gerarchic levels" involved in the concept of "tracking" exist:

The object at the highest level is the set of the tracks P, which contain N elements (each element is a separate track);

In turn, each track is a function in time; consequently it can provide a value of $p_i(t)$ for each t in its domain, $[t_{Ai}, t_{Bi}]$ (obviously, in practice it is impossible to produce an infinite number of values, each track will consequently contain a sequence of values of the $p_i$ vectors, associated with uniformly spaced temporal instants in the interval $[t_{Ai}, t_{Bi}]$—with a sampling period of 0.1 secs, for example);

The p vectors, composed of values of the lines and columns are the lowest level.

Closely associated to $p_i(t)$ is the concept of the versor $KI_{(t)}$ (N.B. the letter "I" in "$KI_{(t)}$" is a reference to the index "i"). Similar to $p_i(t)$, $KI_{(t)}$ indicates the apparent direction of the i-nth point tracked, but in the three-dimensional space of a "Fixed" RF, and not in the two-dimensional plane of the image:

$$KI(t) = \frac{r_{gi} - r(t)}{|r_{gi} - r(t)|}, \forall t \in [t_{Ai}, t_{Bi}] \quad (7)$$

Figure 4:
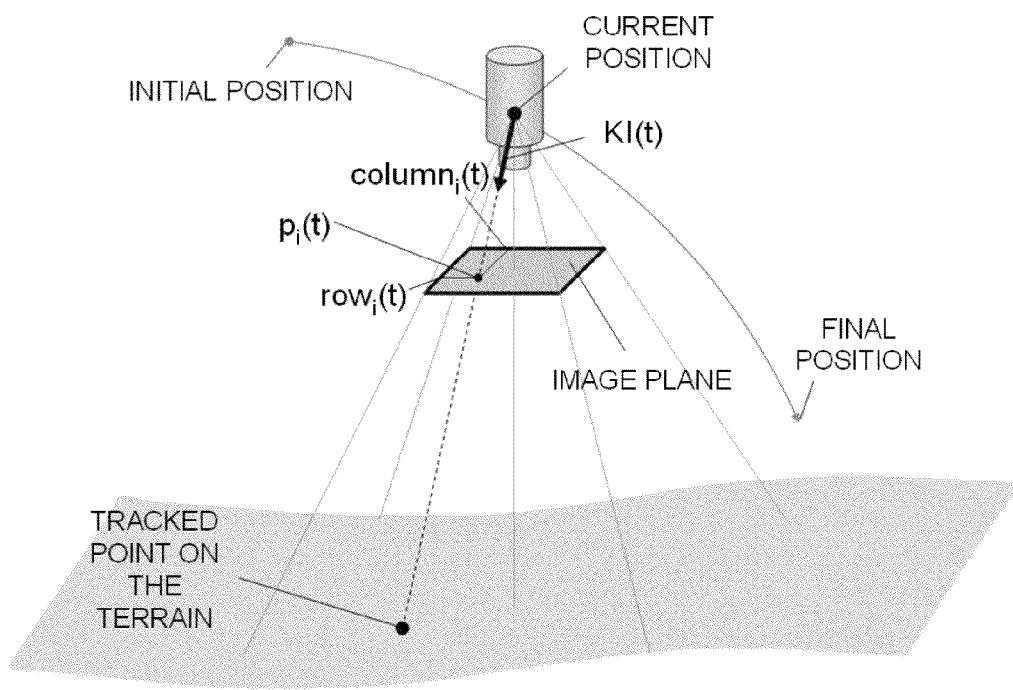
FIG. 4 depicts the relationship between $p_i(t)$ and associated versor $KI_{(t)}$ according to an embodiment of the current invention.

(in the above expression, it has been assumed that the position of the camera can be approximated to the position of the origin of the BRF). FIG. 4 shows the relationship between $p_i(t)$ and $KI_{(t)}$.

Figure 5:
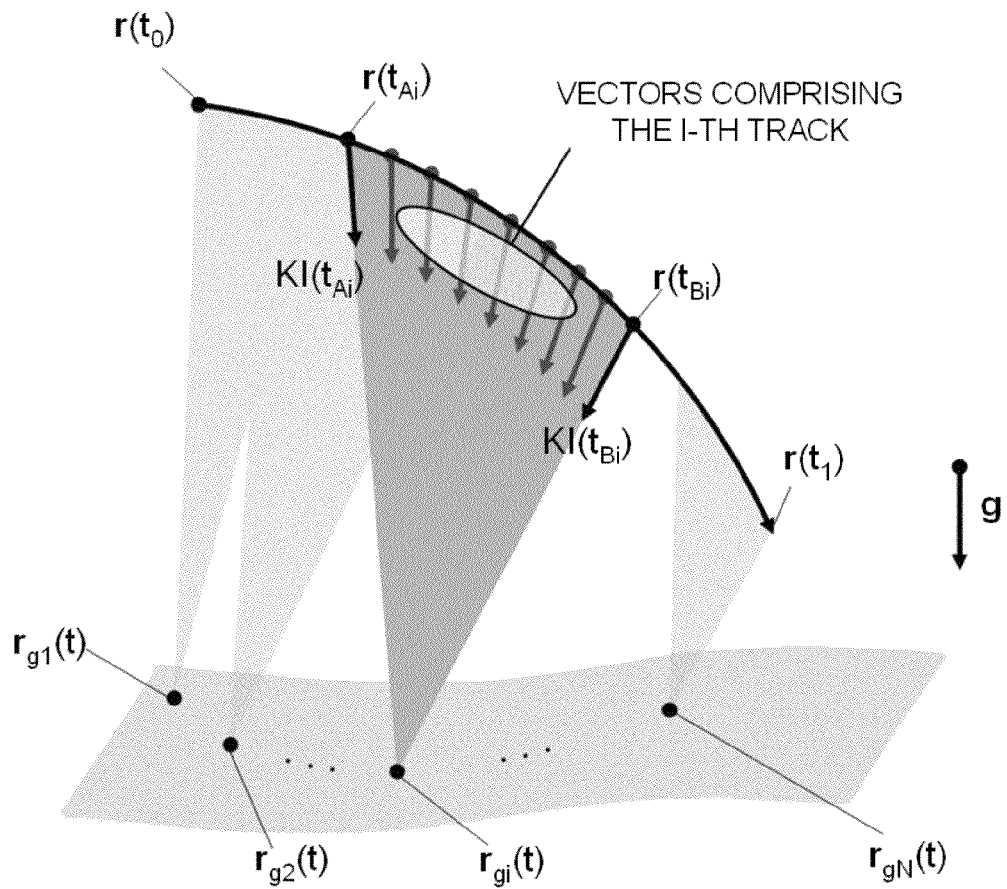
FIG. 5 depicts an example relationship of how the versor $KI_{(t)}$ "follows" the point on the surface $r_{gi}$ while the aircraft moves from $r(t_{Ai})$ to $r(t_{Bi})$, according to an embodiment of the current invention.

It is possible to transform $p_i(t)$ in $KI_{(t)}$ easily, if the attitude of the aircraft is known, as described in the "Pre-elaboration Step". FIG. 5 shows an example of how the versor $KI_{(t)}$ "follows" the point on the surface $r_{gi}$ while the aircraft moves from $r(t_{Ai})$ to $r(t_{Bi})$.

A Description of the Function of the Device

Keeping in mind the concepts introduced up to now, it is possible to describe the function of the Navigation Filter accurately.

(N.B.:here the concept of "profile" of a variable indicates the set of all the values assumed by the variable during a certain temporal interval; this is indicated by inserting the variable between the brackets—for example, the trajectory of the vehicle during the temporal interval 1 is indicated by $(r(t))_I$).

The filter receives the following incoming data input:

The profile of the IMU measurements in the temporal interval 1, that is $(a_m^B(t))_I$ and $(\omega_m^B(t))_I$ The set of the N tracks obtained during the temporal interval 1, that is $P = (p_1(\bullet), p_2(\bullet), \ldots p_N(\bullet))$ Obviously, it is fundamental to specify the reference system in which these estimates will be expressed; this will be done in the following section:

Using these data, the filter must produce the estimates of the profile of the state of the vehicle during the temporal interval 1, that is:

$(r(t))_I$ $(v(t))_I$ $(A(t))_I$ $(\omega(t))_I$.

Definition of the Reference System for Estimating the State

Clearly, the reference system in which the estimates of the state will be expressed must be suitably chosen. An important criteria is that the RF chosen must be such as to allow an efficient use of the estimates produced (by other devices/algorithms used on board the aircraft). To satisfy these conditions, the chosen RF must be "Fixed".

Furthermore, it is fundamental to know the direction of the gravity vector g in the chosen RF. Alternatively, the chosen RF may simply have a Vertical Z Axis by definition, in such a way as to have $g = (0,0,-|g|)^T$ (here the apex T indicates the transposition). This is the assumption considered in following.

Consequently, the RF chosen for the estimates of the state must be defined with respect to some "local" characteristics of the trajectory of the vehicle or of the points observed.

To define this RF, it is useful to introduce an "Auxiliary" RF, ARF, defined in the following way:

It is a "Fixed" RF.

The origin of the RF coincides with the position of the vehicle for $t = t_0$

The axes of the RF coincide with the axes of the BRF for $t = t_0$

In other words, for $t = t_0$ ARF coincides with BRF.

ARF has the useful properties that, in it, $r(t_0) = 0$ e $A(t_0) = I$ (here I indicates the identity matrix 3×3), by definition. ARF also has the disadvantage of not having, generally, a Vertical Z Axis (unless the vehicle has the z "body" axis orientated vertically for $t = t_0$).

On the other hand, if the components of the gravity vector g in the ARF can be calculated, it will be simple to "turn" the ARF to align the z axis with gravity. The resulting RF will be called "Final" RF (FRF), and will be used to express the estimates of the state of the vehicle calculated by the Navigation Filter.

Figure 6:
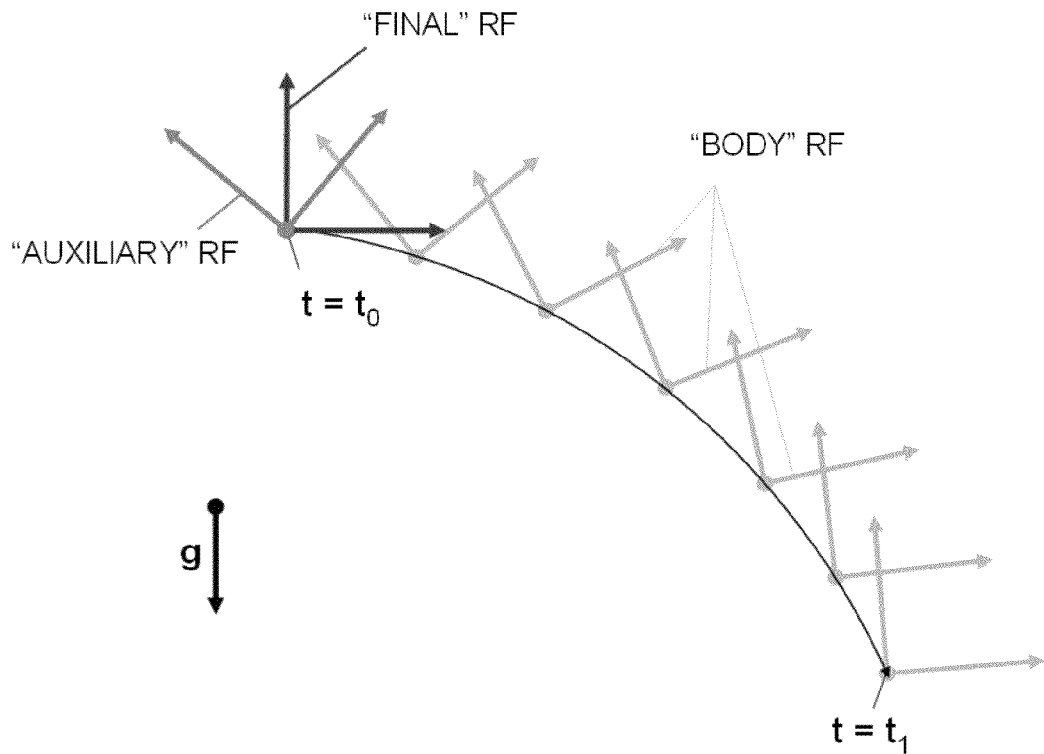
FIG. 6 is a schematic illustration of the RF Reference Systems, according to an embodiment of the current invention.

The RF Reference Systems involved are schematically shown in FIG. 6 (for simplicity, a 2F case has been considered in the figure).

The FRF, centered (like the ARF) in the position of the vehicle for $t = t_0$ has a vertical z axis, and is also "fixed". Consequently this is a suitable RF to express the estimates of the state.

FRF, centred (as in the ARF) in the position of the vehicle for $t = t_0$, has the Vertical Z s state.

A Description of the Algorithm

The algorithm for the navigation filter can be seen, on a high level, as a sequence of three steps:

1) A pre-elaboration step, necessary for some initial calculations to carry out on the incoming input data;
2) A central step: here the principal operations of the filter are carried out; this essentially consists of the estimate (in the ARF) of the velocity of the vehicle (for $t=t_1$) and of the acceleration of gravity, g. This takes place by elaborating the IMU data in the ARF and the set of the tracks elaborated; these data are provided by the pre-elaboration step;
3) A Post-elaboration step; here some of the output of the pre-elaboration step is used, and then combined with the output from the "central step", to obtain the profile of the calculated state in the FRF.

The Pre-Elaboration Step

With this step the incoming data are prepared to be expressed in the correct form—in particular to express them in the "Auxiliary" reference system (ARF).

The Calculation of the Attitude, Angular Velocity and Acceleration Measured in the ARF The first operation carried out has the objective of calculating the profile of the attitude and the angular velocity in the ARF, that is:

$$(A^A(t))_I, (\omega^A(t))_I \quad (8)$$

Starting from the profile of the measurements of the angular velocity, that is $(\omega^B(t))_I$. This is a relatively simple operation, because the initial attitude in ARF is known by definition:

$$A^A(t_0) = I \quad (9)$$

At this point, to calculate the profile of the attitude and of the angular velocity for $t > t_0$, it is possible to use the following expressions:

$$\omega^A(t_n) = A^A(t_n)\omega^B(t_n)$$

$$A^A(t_{n+1}) = [\omega^A(t_n) \times] A^A(t_n) \Delta t \quad (10)$$

where the temporal axis has been discretized with a step $\Delta t$; for $n \geq 0$:

$$t_n = t_0 + n\Delta t \quad (11)$$

Once the profiles $(A^A(t))_I, e(\omega^A(t))_I$ have been obtained, the acceleration measured is also converted by the BRF to the ARF:

$$a_m^A(t) = A^A(t) a_m^B(t) \quad (12)$$

The Elaboration of the Tracks to Calculate the Associated Versors

The objective of this calculation is the elaboration of the set P of the N tracks, $P = (p_1(\bullet), p_2(\bullet), \ldots p_N(\bullet))$ (obtained from the image elaboration device), where every track is a function of time $p_i(t) = (\text{row}_i(t), \text{column}_i(t))$, to obtain a set TP of "transformed" N tracks.

$$TP = (K1(\bullet), K2(\bullet), \ldots KN(\bullet)) \quad (13)$$

where every "transformed" track $KI(\bullet)$ is simply the versor that indicates the direction towards the i-th point tracked, during the "Tracking Interval" $[t_{Ai}, t_{Bi}]$, in the ARF.

Consequently, P can be transformed into TP by calculating—for each track, $1 < i < N$, and for each instant $t \in [t_{Ai}, t_{Bi}]$—the value of $KI_{(t)}$ using the value of $p_i(t)$.

The calculation of $KI_{(t)}$ using $p_i(t)$ can be carried out in the following way:

1) The value of $KI_{(t)}$ in the RF of the camera (CRF) is calculated; this value will be indicated by $K_{RFC}I(t)$.

It is assumed to have a CRF with a z axis passing through the optical axis of the camera, and with its origin on the focal plane of the camera.

Consequently, $K_{RFC}I(t)$ can be calculated using a model of the camera, which associates the co-ordinates of the pixels with directions in space. For example, if a simple "pinhole" model is considered, then $K_{RFC}I(t)$ can be calculated simply with:

$$K_{RFC}I(t) = \frac{1}{\sqrt{\tilde{x}^2(column_i(t)) + \tilde{y}^2(row_i(t)) + 1}} (\tilde{x}(column_i(t)), \tilde{y}(row_i(t)), -1)^T \quad (14)$$

where:

$$\tilde{x}(column) = \left(-1 + 2\frac{column}{N_{column}}\right)\tan\left(\frac{FOV_x}{2}\right), \quad (15)$$

$$\tilde{y}(row) = \left(1 - 2\frac{row}{N_{row}}\right)\tan\left(\frac{FOV_y}{2}\right)$$

and $N_{row}$, $N_{column}$, $FOV_x$, $FOV_y$ are, respectively, the number of lines and columns in the image, and the field of view along the axes x and y of the camera.

2) Given that the position and orientation of the camera with respect to the vehicle are known, it is possible to transform the versor $K_{RFC}I(t)$ into $K_{RFB}I(t)$.
3) Finally, using the information from the attitude of the vehicle in ARF, $K_{RFB}I(t)$ is transformed into $KI_{(t)}$.

To sum up, the output from this pre-elaboration step is the following:

The profiles $(A^A(t))_I, (\omega^A(t))_I$ and $(a_m^A(t))_I$;
The tracks $TP = (K1(\bullet), K2(\bullet), \ldots KN(\bullet))$; every track contains the profile (that is, the values in time) of the versor $KI_{(t)}$, which "points" in the direction of the i-nth point on the surface $r_i^A$.

These vectors are expressed in the ARF.

Central Step

The data from the pre-elaboration step used here are:
The measured acceleration profile, $(a_m^A(t))_I$;
The set TP, containing the tracks of the points, expressed as versors in the ARF.

Furthermore, the value of the norm of the acceleration of gravity (in the region of space observed) gs. is also considered; this data is considered as known.

Using this information, the following values will be calculated:

The gravity acceleration vector in the $ARF: g^A$

The velocity of the vehicle for $t = t_1$, in $ARF: v^A(t_1)$

From now on, in the rest of the description of this part of the algorithm, the apex "A" will be omitted, given that all the vectors will be expressed in the ARF.

The estimate of g and $v(t_1)$ begins by choosing one of the N tracks in the set TP. The index of the generic track chosen will be indicated here by $i* \in [1, \ldots N]$. Using the i-th track as a starting point, a single estimate of g and $v(t_1)$ will be calculated.

(N.B. It is important to note how, during the process of calculation of g and $v(t_1)$, other tracks in TP will also be used, together with the i* track. It is possible, however, to see the i*-nth track as the principal one, i.e. the "pivot").

The i*-nth track, $KI_{(i)}$, starts at the instant $t_{Ai*}$ and ends at $t_{Bi*}$. The temporal instant centred between these two will be indicated by $t_{Mi*}$:

$$t_{Mi*} = \frac{t_{Ai*} + t_{Bi*}}{2} \tag{16}$$

The difference between these two temporal instants will be indicated by T:

$$T_{i*} = t_{Bi*} - t_{Mi*} = t_{Mi*} - t_{Ai*}. \tag{16}$$

In general, it is also possible to consider an algorithm where the temporal moment $t_{Mi*}$ is not exactly centred between $t_{Ai*}$ e $t_{Bi*}$; this may lead to a small increase in accuracy; to obtain a more compact description, this more general case will not be considered here.

It is important to take into account the fact that, at this stage, the co-ordinates of the point of terrain $r_{gi*}$ are not known to the Navigation Filter.

At this point the following simplified notation is introduced, for the positions and the velocity at the temporal instants $t_{Ai*}$, $t_{Mi*}$ e $t_{Bi*}$:

$$r_A = r(t_{Ai*}), r_M = r(t_{Mi*}), r_B = r(t_{Bi*}), v_A = v(t_A), v_M = v(t_M) \tag{17}$$

The differences of the positions are also defined:

$$\text{DELTA\_R} = \Delta r_A = r_M - r_A, \Delta r_B = r_B - r_M \tag{18}$$

These differences are clearly tied to the values of $v_A$, $v_B$, g and of the measured acceleration $a_m$ through the following expressions (in the integrals, the subscript "i*" has been omitted from the temporal limit, to simplify the notation):

$$\Delta r_A = v_A T + \int_{t_A}^{t_M} \int_{t_A}^{t} a_m(\tau) d\tau dt + \frac{1}{2} g T^2 \tag{19}$$

$$\Delta r_B = v_B T + \int_{t_M}^{t_B} \int_{t_M}^{t} a_m(\tau) d\tau dt + \frac{1}{2} g T^2$$

Furthermore, taking into account that:

$$v_M = v_A + \int_{t_A}^{t_M} a_m(t) dt + gT \tag{20}$$

we have:

$$\Delta r_A = v_A T + h_{AM}^{II} + \frac{1}{2} g T^2$$

$$\Delta r_B = v_A T_{i*} + h_{AM}^{I} T_{i*} + h_{MB}^{II} + \frac{3}{2} g T^2 \tag{21}$$

where $\Delta r_A$ e $\Delta r_B$ have been expressed according to $v_A$, g, and the following values that indicate the integrals of the measured acceleration:

$$h_{AM}^{I} = \int_{t_A}^{t_M} a_m(t) dt, \tag{22}$$

$$h_{AM}^{II} = \int_{t_A}^{t_M} \int_{t_A}^{t} a_m(\tau) d\tau dt,$$

$$h_{MB}^{II} = \int_{t_M}^{t_B} \int_{t_M}^{t} a_m(\tau) d\tau dt$$

-continued $$h_{AM}^{I} = \int_{t_A}^{t_M} a_m(t) dt, \tag{23}$$

$$h_{AM}^{II} = \int_{t_A}^{t_M} \int_{t_A}^{t} a_m(\tau) d\tau dt,$$

$$h_{MB}^{II} = \int_{t_M}^{t_B} \int_{t_M}^{t} a_m(\tau) d\tau dt$$

It is important to take into account the fact that $h_{AM}^{I}$, $h_{AM}^{II}$ and $h_{MB}^{II}$ can be calculated by the filter, given that the profile of $a_m(t)$ is known.

At this point, it is useful to subdivide the differences of the positions into a "position" part and a "length" part.

$$\text{DELTA\_R} = \Delta r_A = l_A UA, \Delta r_B = l_B UB \tag{24}$$

where UA and UB are two versors.

The values of UA and UB can be calculated by the filter, using the available tracks. The procedure for doing so will now be described, in the case of a generic versor U, which indicates the movement between two temporal instants T1 and T2, that is for which it is given that $r(T2) - r(T1) = l_G U$, where $l_G$ is a scalar. For UA and UB the procedure is the same.

Figure 7:
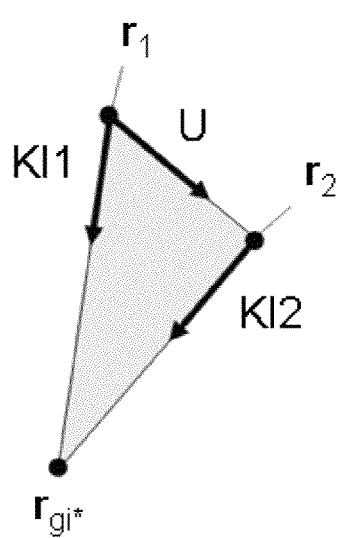
FIG. 7 depicts the triangle of versors U (from $r_1$ a $r_2$), KI1 (from $r_1$ a $r_{gi*}$), and KI2 (from $r_2$ a $r_{gi*}$) with associated vertices.

Considering the plane defined by the points $r_1 = r(T1)$, $r_2 = r(T2)$ e $r_{gi*}$, it can be easily seen that the following versors are all parallel to this plane:
U (the versor from $r_1$ a $r_2$);
KI1 (the versor from $r_1$ a $r_{gi*}$);
KI2 (the versor from $r_2$ a $r_{gi*}$)
The triangle of said versors with the vertices is shown in FIG. 7.

Consequently, the versor:

$$KCI = \frac{KI1 \times KI2}{|KI1 \times KI2|} \tag{25}$$

is orthogonal to U, that is KCI·U=0 (here "." indicates the scalar product).

If we assume that, instead of having a single track from t=T1 to t=T2, which follows a point of terrain $r_{gi*}$, there is more than one, it is possible to define more triangles analogous to this. Consequently, it is also possible to define more KCI versors, all orthogonal to U.

Figure 8:
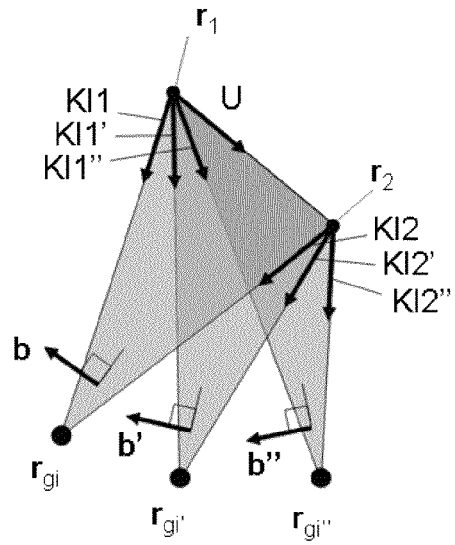
FIG. 8 depicts three tracks that respectively follow the points of terrain $r_{gi}$, $r_{gi'}$ and $r_{gi''}$.

For example, considering three tracks, which respectively follow the points of terrain $r_{gi}$, $r_{gi'}$ and $r_{gi''}$, the situation shown in FIG. 8 is obtained.

From here it is easily possible to see that $\hat{b} \cdot U = 0$, $\hat{b}' \cdot U = 0$ e $\hat{b}'' \cdot U = 0$. Consequently, it is possible to calculate U by looking for the vector that is orthogonal to $\hat{b}$, $\hat{b}'$ and $\hat{b}''$ (if there were no errors in the incoming data, it would be sufficient to make the cross product between two $\hat{b}$ vectors of this type).

Consequently, it is easily possible to construct a method for estimating U (also in the presence of errors) starting from the "pivot" track $KI_{(i)}$ (which starts at T1 and ends at T2). Using this track, a triangle and a $\hat{b}$ vector are obtained. Then other tracks from TP=(K1(•), K2(•), ... KN(•)) are added, to obtain more triangles and $\hat{b}$ versors.

Since the U versor indicates the "direction of movement" between t=T1 and t=T2, i.e.

$$UA = \frac{r(T2) - r(T1)}{|r(T2) - r(T1)|} \tag{26}$$

Figure 9:
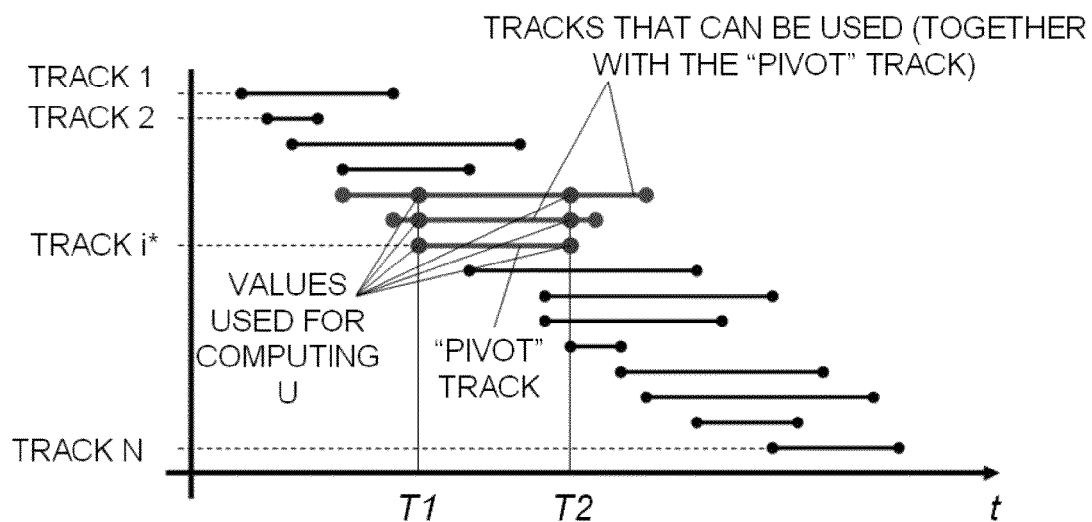
FIG. 9 is a graphical illustration showing an example of a solution for what concerns the identification of "admissible" tracks, according to an embodiment of the current invention.

The TP tracks that can be added are only those that begin before T1 and finish after T2. This is due to the fact that, to define a triangle (and the corresponding b̂ versor) starting from a $KI_{(t)}$ track, it is necessary to be able to evaluate this track for the temporal instants t=T1 and t=T2. FIG. 9 shows an example of a solution for what concerns the identification of such "admissible" tracks.

To be able to evaluate this track for the temporal instants t=T1 e t=T2, FIG. 9 shows an e a solution for as much as regards the identification of such "admissible" tracks.

The overall method is consequently the following:

1) Starting from the TP set, a sub-set Q*=(K1(•), K2(•), . . . KM(•)) is identified, composed of the tracks that start before T1 and that finish after T2 (it is possible to easily modify the algorithm to also take into account the case where the number of tracks identified in this way, M, is too low for an accurate estimate for example, by allowing a modification of T1 and T2;).

2) For each track KI(•) of Q* (with I∈[1, . . . M]), the values for t=T1* and t=T2 are evaluated:

$$KI1=KI(T1), KI2=KI(T2) \quad (27)$$

3) Then the orthogonal versor to both is constructed:

$$KCI = \frac{KI1 \times KI2}{|KI1 \times KI2|} \quad (28)$$

4) At this point, we have a set of M versors, E=(KC1, KC2, . . . KCM). If there were no errors in determining the tracks, all these versors would be orthogonal to U. In practice, in the presence of errors, it is useful to find U by looking at the "most orthogonal" versor to all the (KCI). Here, this is done by minimizing the function:

$$J(u)=\Sigma_{I=1}^{M}(KCI \cdot u)^2 \quad (29)$$

with the constraint:

$$|u|=1 \quad (30)$$

To minimize the function, it is necessary to find the points, on the unitary sphere, where the gradient of J(u), ∇J(u), is perpendicular to the plane tangent to the sphere. Consequently ∇J(u), must be parallel to u, that is:

$$\nabla J(u)=\lambda u \quad (31)$$

where λ is a scalar.

The expression for the gradient of J is:

$$\nabla J(u)=Wu \quad (32)$$

where:

$$W = 2\begin{bmatrix} w_1 \cdot w_1 & w_1 \cdot w_2 & w_1 \cdot w_3 \\ w_2 \cdot w_1 & w_2 \cdot w_2 & w_2 \cdot w_3 \\ w_3 \cdot w_1 & w_3 \cdot w_2 & w_3 \cdot w_3 \end{bmatrix} \quad (33)$$

where $w_1$, $w_2$ and $w_3$ are three vectors with components, obtained, respectively, from the components x, y and z of the KCI vectors:

$$w_1=(KC1_x, KC2_x, \ldots KCM_x)^T$$

$$w_2=(KC1_y, KC2_y, \ldots KCM_y)^T$$

$$w_3=(KC1_z, KC2_z, \ldots KCM_z)^T \quad (34)$$

The vector U must, therefore, satisfy the condition:

$$WU=\lambda U \quad (35)$$

for a certain λ.

Consequently, U is found among the autovectors of W.

To calculate UA, KIA is used (the versor from $r_A$ to $r_{gi*}$) in the place of K1, and KIB (the versor from $r_B$ a $r_{gi*}$) in the place of K2.

To calculate UB, KIM is used (the versor from $r_B$ to $r_{gi*}$) in the place of K2.

This minimum-squares estimate of U can be expanded (for example, using the noted technique of Random Sample Consensus, or RANSAC) to make the method of estimation more robust to "outlier" tracks (i.e. "spurious" tracks).

It is important to take into account the fact that the choice of the set Q* depends on the values of T1 e T2 which, in turn, depend on the choice of the "pivot" track i*.

At this point—assuming that the estimates of UA and UB have been calculated—two triangles, TRA and TRB, are considered (generally not co-planar), with, respectively the following vertices $$r_{gi*}, r_M e r_A$$

$$r_{gi*}, r_B e r_M$$

$$r_{gi*}, r_M e r_A$$

$$r_{gi*}, r_B e r_M$$

Figure 10:
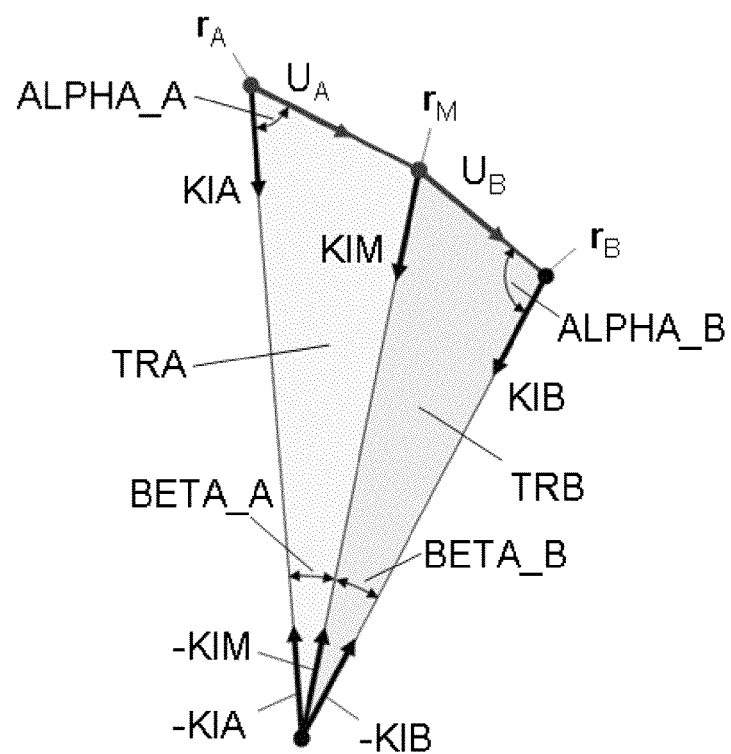
FIG. 10 depicts two triangles TRA e TRB with common side, and associated vectors.

The two triangles TRA e TRB, and some associated vectors, are shown in FIG. 10.

The two triangles have a common side, with the length of l* (the value of l* is not known at this stage).

The values of ALPHA_A, ALPHA_B, BETA_A e BETA_B are obtained by calculating the angles of some known versors:

$$ALPHA\_A=\arccos(UA \cdot KIA), ALPHA\_B= \arccos(-UB \cdot KIB)$$

$$BETA\_A=\arccos(KIA \cdot KIM), BETA\_B= \arccos(KIB \cdot KIM), \quad (36)$$

Using the sine theorem, the following expressions are obtained:

$$\frac{\sin(ALPHA\_A)}{l^*} = \frac{\sin(BETA\_A)}{l_A}, \frac{\sin(ALPHA\_B)}{l^*} = \frac{\sin(BETA\_B)}{l_B} \quad (37)$$

These expressions are used to eliminate l* and to obtain an expression for the ratio between $l_B$ e $l_A$. Here, this ratio is indicated by RHO:

$$RHO = \frac{l_B}{l_A} = \frac{\sin(ALPHA\_A)\sin(BETA\_B)}{\sin(ALPHA\_B)\sin(BETA\_A)} \quad (38)$$

At this point, the equations (22) are reorganized (subtracting the first from the second) to eliminate $v_A$, and then the expressions (24) are used (for the differences of position), and (38), (for the relationship between $l_B$ and $l_A$). The expression obtained is:

$$UBl_A RHO - UAl_A = h_{AM}^I T_{i*} + h_{MB}^{II} - h_{AM}^{II} + gT_{i*}^2 \quad (39)$$

This expression can be simplified by introducing the following quantities:

$$s_0 = UB\ RHO - UA$$

$$s_1 = h_{AM}^I T_{i*} + h_{MB}^{II} - h_{AM}^{II}$$

$$s_2 = T_{i*}^2 \quad (40)$$

where $s_0$ and $s_1$ are vectors, and $s_2$ is a scalar. It is important to take into account the fact that $s_0$, $s_1$ e $s_2$ can all be calculated by the filter, using the available incoming input data.

The resultant equation, which binds $l_A$ with g, is the following:

$$s_0 l_A = s_1 + s_2 g \tag{41}$$

This is a vector equation (corresponding to three scalar equations), with 4 unknown scalars (the value of $l_A$, and the three components of the gravity vector g, in the ARF). By adding the condition |g|=gs to this (where gs has been an assumed known), a system of 4 scalar equations and 4 unknown scalars is obtained. It is possible to reduce this to a single quadratic equation with $l_A$ as an unknown, writing the condition that regards gravity as $g \cdot g = g_s^2$ and then substituting g, with (41). The resultant equation to calculate $l_A$ is:

$$|s_0|^2 l_A^2 - 2(s_0 \cdot s_1) l_A + |s_1|^2 - g s s_2^2 = 0 \tag{42}$$

This equation has two solutions for $l_A$; the correct one can be identified by simple checks of the values of the estimates obtained (for example, with the "wrong" solution, typically, a gravity vector that points upwards is obtained).

Once $l_A$ has been obtained, g is calculated, using (41). Successively, $l_B$ is calculated, using the value of RHO ((calculated with (38)). From $l_A$ and $l_B$, the DELTA_R=$\Delta r_A$ and $\Delta r_B$ vectors are obtained from (24).

At this point, using (22), $v_A$ is also calculated. Finally, the value of the velocity for $t=t_1$ is obtained simply through integration:

$$v(t_1) = v_A + \int_{t_A}^{t_1} a_m(t) dt + (t_1 - t_A) g \tag{43}$$

As indicated at the beginning of the description of the central step of the algorithm, these values of $v(t_1)$ and g have been obtained using a generic track i* as a "starting point" (or "pivot"). If there were no errors in the incoming input data, it would be sufficient to choose arbitrarily a value for i* in the set [1, ... N], start from the corresponding track, and then follow the method described here to obtain the correct values of $v(t_1)$ and g.

In practise, the incoming input data will have errors; consequently, to reduce the error of the estimate of $v(t_1)$ and g, a procedure of calculation of the average can be used, for example:

1) Each of the N tracks in TP=(K1(•), K2(•), ... KN(•)) is taken as a "pivot", i*, to generate a single pair of estimates of the velocity (at $t_1$) and the gravity, indicated by $(v_{i*}(t_1), g_{i*})$;
2) Starting from the N estimates of $v(t_1)$ and g obtained in this way, the average is calculated, to reduce the estimation errors.

Instead of a simple operation of averages, it is also possible to consider other methods (for example, the median, or RANSAC) to obtain a more robust estimate with respect to the "outliers".

Furthermore, another variant consists in the creation of a weighted average of the single estimates, calculating the averages as a function of the variances of the single estimates (the values of the variances could, in turn, be estimated by propagating the values assumed for the input uncertainties throughout the calculations), minimizing the total error estimate.

The Post-Elaboration Step

This step receives the following data:

From the pre-elaboration step: attitude, angular velocity and acceleration profiles, measured in the ARF, that is $(A^A(t))_I$, $(\omega^A(t))_I$ and $(a_m^A(t))_I$ From the central step: the estimates of di $v^A(t_1)$ and $g^A$ The objective of this step is the calculation of the profile of the state (composed of the profiles of attitude, angular velocity, position and linear velocity) in the FRF.

The first operation carried out here has, as its objective, the calculation of the profile of velocity and position in FRF.

The velocity profile is calculated simply by integrating the estimate of $v^A(t_1)$ using $(a_m^A(t))_I$ and g:

$$\forall t \in I, v^A(t) = v^A(t_1) + \int_{t_1}^{t} a_m^A(\tau) d\tau + (t - t_1) g^A \tag{44}$$

Given that $r^A(t_0) = 0$ by definition, the profile of position is calculated by simple integration of the velocity:

$$\forall t \in I, r^A(t) = \int_{t_0}^{t} v^A(\tau) d\tau \tag{45}$$

At this point, all the components of the profile of the state in ARF (that is $(r^A(t))_I$, $(v^A(t))_I$, $(A^A(t))_I$, $(\omega^A(t))_I$) are available.

To convert them into FRF, a rotation matrix that describes the transformation ARF→FRF is applied; this transformation takes into account the fact that FRF has a Vertical Z Axis, while ARF does not.

Consequently, the rotation matrix is the one that describes the rotation around an axis by a certain angle, where:

The axis is the orthogonal vector both to the gravity vector and to the Z axis of the ARF.

The angle φ is the angle between the gravity vector and the Z axis of the ARF—consequently, from the component z of the gravity vector in the ARF, $g_z^A$ is obtained:

$$\varphi = \arccos\left(-\frac{g_z^A}{gs}\right) \tag{46}$$

In this way, intuitively, the rotation "straightens" all the components of the profile of the state in ARF, putting them into FRF.

Additional Information

The Temporal Operation of the Filter

In the description up to this point, the "batch" mode of the Navigation Filter has been described. In this mode, the algorithm operates in the following way:

it receives, as input, the data obtained during the temporal interval $[t_0, t_1]$ it then produces, in output, the estimates of the state, relative to the entire temporal interval $[t_0, t_1]$ In practice, the Filter will typically operate in an "incremental" mode, where:

The algorithm will be called to a frequency that may be relatively high (for example 10 Hz), and For each call, the algorithm:

Will receive the input obtained between the preceding call and the present one, and:

Must calculate the estimate of the "current" state.

To obtain the operation in the "incremental" mode, the following modifications are made:

Between successive calls of the algorithm, the values of the input data are memorized (together with other relevant data, such as, for example, the estimates of $v(t_1)$ and g) in a memory.

At each call, the algorithm inserts the new input data into the memory, and then processes all the data relevant to the estimate that are contained in it (for example, from a certain temporal instant onwards).

Cases of Non-Observable Velocity

Generally, any Navigation Filter—which uses only IMU data and tracks of unknown points on the surface—cannot estimate the velocity (and therefore not even the differences in position) if the acceleration is null; it is possible to demonstrate this by taking into account the fact that in such a situation numerous profiles of velocity and position exist that produce the same profile of input data; consequently, the Navigation Filter "cannot decide" the correct trajectory.

In the case of the Navigation Filter considered here, if the acceleration is ≈0 during the tracking interval $[t_{Ai*}, t_{Bi*}]$ (corresponding to the "pivot" track i*-th), the result will be:

$$UB \approx UA, RHO \approx 1 \quad (47)$$

and consequently, from (40), $$s_0 \approx 0 \quad (48)$$

and therefore the estimates of $l_A$ obtained with (42)—and also the resultant estimates of $v_{i*}(t_1)$ and $g_{i*}$—will not be reliable. In such situations, it is possible to carry out the following operations:

In the process of accumulation of single estimates of $v(t_1)$ and g, the values obtained with the "pivot" tracks, which have as tracking intervals temporal periods with low acceleration, will be excluded from the calculations Alternatively, it is possible to combine the estimates based on the IMU and on the tracks with additional information relative to the model of the vehicle. For example, in the case of a landing on Mars, if the Navigation Filter begins to operate when the vehicle is still attached to the parachute, there is a situation where a low acceleration may occur when the vehicle approaches terminal velocity (before releasing the parachute). However, in a situation of this kind, the equations of the dynamics can become simpler (for example, the movement could be almost vertical and uniform), and therefore a knowledge of the model can be used to estimate the limits on the modulus of velocity (for example, in a very simple case, the modulus of the velocity would correspond to the terminal velocity).

It is important to take into account the fact that the direction of movement can be observed also with nil acceleration (using the method for the estimate of $\hat{u}_A$, of the "Central Step").

Additional Functions

The Navigation Filter considered up to here can also be used to implement some additional functions which are described here in following.

The Reconstruction of the Shape of the Terrain

This function can be easily added, by performing a triangulation operation once the values of $r_A$ e $r_M$ have been estimated. It is possible to take the set of the $Q^* = (K1(\bullet), K2(\bullet), \ldots KM(\bullet))$ tracks used for the estimate of UA, and the set of the resultant vectors (KJ1) and (KJ2). At this point, for each $J \in \{1, \ldots M\}$, the position of the point $r_{g*J}$ on the surface can be obtained by seeking the intersection (or the point of minimum distance) between:

The semi-ray that starts from $r_A$ and goes in the direction KJ1

The semi-ray that starts from $r_M$ and goes in the direction KJ2

The Addition of Extra Sensors

The combination of sensors considered—IMU and camera—can be extended by adding other sensors to further increase the robustness and the accuracy of the process of estimate of the state. The Navigation Filter can, in fact, be adapted to receive data from additional sensors such as:

Star sensors: these can be used to supply directly the measurements of the attitude of the vehicle (for example, for a lunar landing);

An altimeter: the addition of an altimeter can permit an increase in the accuracy of the estimates of the state, providing an alternative method for estimating one of the principal measurements involved, that is the length of the "difference of position", DELTA_R=$\Delta r_A$ (considered in the "Central Step" of the algorithm of the filter). Essentially, by processing the data of the altimeter, the length of the projection of the vector DELTA_R along the direction $\hat{n}_{altimeter}$ is measured (this vector indicates the direction of aim of the altimeter); indicating this length with $l_{altimeter}$, to calculate the value of $l_A$ it is possible to use the following expression (where $\hat{n}_{altimeter}$ and K1 are both calculated in the ARF reference system):

$$l_A = \frac{l_{altimeter}}{K1 \cdot \hat{n}_{altimeter}} \quad (49)$$

Scanning LIDAR: this sensor permits the measurement of the distances along the direction of a laser beam, and this direction can be controlled on the two levels of freedom (alternatively, a sensor of the "Flash" LIDAR type can be used). In this way, a scan of the terrain below is obtained, expressed with respect to the vehicle. By estimating the apparent movement of the scanned terrain, the movement of the vehicle can be reconstructed. Similar to the case of the altimeter, here the Scanning LIDAR represents an alternative method for estimating $\Delta r_A$ (on the other hand, here also all the three components of the vector $\Delta r_A$ can be observed).

Absolute Navigation

This function permits the estimation of the profile of the state of the vehicle in a "planet-centred" (PRF) reference system, that is a reference system which is used to specify (in an unambiguous way) the points of the terrain on the celestial body considered—such as, for example, by latitude, longitude and height (obviously to be opportunely defined).

To create this function, the Navigation Filter must also have available a set of "pre-loaded" data (that is, made available before the start of the functioning of the filter). In this case, these data correspond to a "map" of the terrain (for example, composed of a combination of a Digital Elevation Model and an ortho-image), referred with respect to the PRF reference system.

Without loss of generality, a Carthesian PRF is presumed, with a Vertical Z Axis.

Here two variants of the functioning of the filter are considered:

A variant "without attitude measurements": here it is presumed that an additional input is not present to supply (during the temporal interval of the functioning of the filter I) the profile of the attitude of the vehicle in the PRF (this profile could be obtainable, for example, through the star sensors);

A variant "with attitude measurements": here the above mentioned attitude profile is presumed.

In the case of variant A, the steps of the algorithm to be used are the following (the difference between the variants A and B is that in the case of the variant B the second step is "skipped", since the profile of the attitude in the PRF is already available:
  The execution of the "standard" algorithm (previously described);
  The determination of the profile of the attitude in the PRF;
  The calculation of the position in the PRF;
  The calculation of the profile of the state of the vehicle in the PRF.

The first step has the objective of estimating the profile of the state in the PRF:

In the second step, it is necessary to determine the rotation between the FRF and the PRF. Given that these two reference systems have a common z axis, it is sufficient to determine the angle of rotation around this axis, necessary to pass from one RF to the other.

This angle, indicated here by a, can be calculated starting from the following values:
  1) The direction of the velocity, in the xy plane of the PRF, for a certain $t_\alpha$ (also less than to): this deals with a typically known size—for example, in the case of a landing on Mars or on the Moon, this value is obtainable from the parameters of the orbit of the vehicle (typically known with an acceptable accuracy).
  2) The direction of the velocity, in the xy plane of the PRF: can be calculated starting from the output of the first step (that is the "standard" algorithm)—if $t_\alpha \leq t_0$, the IMU measurements obtained between $t_\alpha$ and $t_0$ are used.

Indicating respectively these two directions of the velocity with $\theta_{PRF}$ and $\theta_{FRF}$, we obtain that α is given simply from:

$$\alpha = \theta_{PRF} - \theta_{FRF} \tag{50}$$

At this point, to determine the complete transformation between the FRF and the PRF (which will permit the transformation of the profile of the state in the PRF into that in the PRF), it is also necessary to determine the translation (expressed as a vector of the PRF) which leads from the origin of the PRF to the origin of the FRF. This vector obviously coincides with the difference between the vector $r(t_P)$, expressed in the PRF, and the same vector, expressed in the FRF (here $t_P \in I$). Given that the position values in the FRF are known (having been obtained in the first step), it remains to calculate the $r(t_P)$ vector in the PRF. The procedure for doing this is described here in following.

For simplicity of notation, this vector will, in following, be indicated by r.

By confronting the pre-loaded "map" of the terrain with the terrain observed by the camera, some points on the image are identified, for which the co-ordinates in the PRF are known. These points (in the PRF) will be indicated by $r_{g1}, r_{g2}, \ldots r_{gS}$. By using the estimate of the attitude in the PRF, it is possible to obtain the versors (in the PRF) associated with each of these points; these versors will be indicated by $\hat{n}_{g1}, \hat{n}_{g2}, \ldots \hat{n}_{gS}$ (each versor indicates the apparent direction of the corresponding point on the terrain).

Each pair $(r_{gi}, \hat{n}_{gi})$, for $i \in \{1, \ldots S\}$, defines a semi-ray, whose points can be parametered with $l_i > 0$:

$$q_i(l_i) = r_{gi} + \hat{n}_{gi} l_i \tag{51}$$

In the absence of errors, all these semi-rays would cross at a certain point r. In other words, for each $i \in \{1, \ldots S\}$ we would have a value $l_i^*$ such for which $q_i(l_i^*) = r$.

Obviously, in practise it is impossible that these semi-rays cross. To obtain an estimate of r, a minimum-squares approach is followed, minimizing the value of f(r) defined by:

$$f(r) = \Sigma_{i=1}^S d_i^2(r) \tag{52}$$

where $d_i(r)$ indicates the minimum distance between the point r and the i-th semi-ray:

$$d_i(r) = \min_{l_i > 0} |r - q_i(l_i)| \tag{53}$$

The $q_i(l_i^r)$ point of the semi-ray nearest to the point r is the one that verifies the condition:

$$\hat{n}_{gi} \cdot (r - q_i(l_i^r)) = 0 \tag{54}$$

and therefore $l_i^r = \hat{n}_{gi}^T (r - r_{gi})$; consequently, it results that:

$$d_i(r) = |r - q_i(l_i^r)| = |r - r_{gi} - \hat{n}_{gi} \hat{n}_{gi}^T (r - r_{gi})| = |B_i(r - R_{gi})| \tag{55}$$

where $B_i = I - \hat{n}_{gi} \hat{n}_{gi}^T$. It is therefore possible to re-write the expression for $d_i^2(r)$ as:

$$d_i^2(r) = (B_i(r - r_{gi}))^T (B_i(r - r_{gi})) = (r - r_{gi})^T C_i (r - r_{gi}) \tag{56}$$

where $C_i = B_i^T B_i$ is a symmetric matrix. The gradient of f(r) is therefore given by:

$$\nabla f(r) = \Sigma_{i=1}^S \nabla(d_i^2(r)) = \Sigma_{i=1}^S 2C_i(r - r_{gi}) = Dr - h \tag{57}$$

where $D = 2\Sigma_{i=1}^S C_i$ and $h = 2\Sigma_{i=1}^S C_i r_{gi}$. Consequently, the value of r for which f(r) is minimum is obtained through the expression:

$$r = D^{-1} h \tag{58}$$

At this point, the profile of the state in the PRF can be calculated, starting from the one in the FRF (obtained with the "standard" algorithm) and performing the following transformations:
  A rotation around the z axis, of an angle α;
  A translation of r.

To further reduce the error of estimate of the state in the PRF, the following operation can be carried out:
  1) The values of the position of the vehicle in the PRF for diverse temporal instants of I are calculated (instead of only for $t_P \in I$).
  2) Then, these estimates, indicated here by $r(t_{P1})$, $r(t_{P2}), \ldots r(t_{PH})$, are elaborated in the following way:
    For each $i \in \{1, \ldots H\}$, we obtain (from the value of $r(t_{Pi})$), an independent estimate of the translation from the PRF to the FRF. Calculating the average of the estimates obtained in this way, the total error of estimate of this translation is reduced.
    Similarly, for a certain instant $t^* \in I$, independent estimates of $v(t^*)$ (to be subsequently averaged) can be obtained by using pairs of points $(r(t_{Pi}), r(t_{Pj}))$ (where $(i,j) \in \{1, \ldots H\}$ e $i \neq j$) through the expression:

$$v(t^*) = \frac{1}{t_{Pj} - t_{Pi}} \left( r(t_{Pj}) - r(t_{Pi}) - \int_{t_{Pi}}^{t_{Pj}} \int_{t_{Pi}}^{t} a_m(\tau) \, d\tau \, dt - \frac{1}{2} g(t_{Pj} - t_{Pi})^2 \right) + \int_{t_{Pi}}^{t^*} a_m(t) \, dt + g(t_{Pj} - t^*) \tag{59}$$

What is claimed is:

1. Device to estimate the state of a moving vehicle, composed of an inertial measurement unit (IMU), measuring the angular velocities and the accelerations of said vehicle, by a camera (CAM) and by a device (PROC) for the processing of the terrain photographic images taken at successive instants, identifying a set of characteristic points of the terrain, which are tracked on the different images, and by a navigation filter (NF) which using a suitable algorithm calculates the state of the vehicle in terms of velocity, position, attitude and angular velocity, in a reference frame fixed with respect to the ground, characterized in that:

the navigation filter, in order to get a unit vector (U), indicating the direction of the displacement of the vehicle between two time instants (T1) and (T2), performs the following two computing steps:

A) calculates at first a set of vectors, (E), which in case of no measurement errors would be all orthogonal to the said unit vector (U), by performing the following operations:

A.1) integrates the angular velocity measurements of the inertial measurement unit in order to obtain the profile of the attitude, i.e. the temporal behaviour of the attitude during a time interval, with respect to a reference frame fixed with respect to the ground, A.2) utilizes the said attitude profile in order to process the output of the image processing device, i.e. the set of pixel tracks where each pixel track describes the apparent motion of a characteristic point of the terrain in the sequence of the images, in order to obtain a set (TP) of tracks of unit vectors, where each unit vector track is a function of time and describes the motion of said characteristic point in a reference frame fixed with respect to the ground, A.3) the set (E) is constructed by performing the following computations on each member (K1) of a subset of (TP): A.3.1) the values of (KI) at (T1) and (T2), indicated respectively with (KI1) and (KI2), are extracted, A.3.2) the normalized vector cross product of (KI1) and (KI2), indicated with (KCI), is computed, A.3.3) (KCI) is inserted in the set (E), B) determines, through the method of the least squares, the vector closer to the perpendicular to the said set of vectors (E) and that in this way better approximates the actual unit vector (U);

to obtain the ratio, (RHO), between the lengths of the displacements of the vehicle, respectively in the timeframe from (TA) to (TM) and from (TM) to (TB), where (TA), (TM) and (TB) are three successive time instants, the navigation filter performs the following computations:

A) computes, by using the procedure described above, the vectors (UA) and (UB), that indicate the directions of the displacements of the vehicle respectively between time instants (TA) and (TM), and (TM) and (TB), B) for each unit vector track (KI) that is a member of the said set (TP), two triangles, (TRA) and (TRB), are defined when possible, such that the vertices of (TRA) are: the position of the vehicle at time (TA), the position of the vehicle at time (TM), and the point on the terrain tracked by (KI) and the vertices of (TRB) are: the position of the vehicle at time (TM), the position of the vehicle at time (TB), and the said tracked point of the terrain, C) the relevant angles of the triangles (TRA) and (TRB) are computed by performing the following operations: a) three unit vectors, (KIA), (KIM) and (KIB), belonging to the said pixel track (KI), and associated respectively to the time instants (TA), (TM) and (TB), are extracted from the said pixel track b) the angle between vectors (KIA) and (UA), which is also the angle (ALPHA) of the triangle (TRA), is computed, c) the angle between vectors (KIA) and (KIM), which is also the angle (BETA) of the triangle (TRA), is computed, d) the angle between the opposite of the vector (UB), and the vector (KIB), is computed, which is also the angle (ALPHA) of the triangle (TRB), is computed, e) the angle between vectors (KIB) and (KIM), which is also the angle (BETA) of the triangle (TRB), is computed, D) (RHO) is then computed by multiplying the sine of the angle (ALPHA) of (TRA) with the sine of the angle (BETA) of (TRB), and then dividing that product with the product of the sine of the angle (ALPHA) of (TRB) with the sine of the angle (BETA) of (TRA); multiple estimates of (RHO) can be combined, to calculate the length of the displacement of the vehicle between two time instants, the navigation filter processes the said unit vectors (U), the said ratio (RHO), and the measurements of the inertial measurement unit, conveniently treated, together with the value of the gravity acceleration vector or the value of the norm of such vector.

2. Method to estimate the state of a moving vehicle, on the base of the measurements of an inertial measurement unit, sensing the angular velocities and the accelerations of said vehicle, and of the processing of the photographic images of the terrain taken at successive instants, identifying a series of characteristic points of the terrain, which are tracked on the different images, and that by a suitable algorithm calculates the state of the vehicle in terms of velocity, position, attitude and angular velocity, in a reference frame fixed with respect to the ground and characterized in that:

in order to get the unit vector (U), indicating the direction of the displacement of the vehicle between two time instants, calculates at first a set of vectors, (E), which in case of no measurement errors would be orthogonal to the said unit vector (U), and then determines, through the method of the least squares, the vector closer to the perpendicular to the said set of vectors (E) and that in this way better approximates the actual unit vector (U);

to obtain the ratio, (RHO), between the lengths of the displacements of the vehicle, respectively in the timeframe from (TA) to (TM) and from (TM) to (TB), where (TA), (TM) and (TB) are three successive time instants, at first the angles of two triangles are calculated, having respectively the following vertices: a) the position of the vehicle at time (TA), the position of the vehicle at time (TM), and one of the points on the terrain tracked in the images, and b) the position of the vehicle at time (TM), the position of the vehicle at time (TB), and the said tracked point of the terrain, and then the triangle law of sines is applied;

to calculate the length of the displacement of the vehicle between two time instants, the said unit vectors (U), the said ratio (RHO), and the measurements of the inertial measurement unit, conveniently treated, are processed together with the value of the gravity acceleration vector or the value of the norm of such vector.

3. Method as in claim 2 to estimate the state of a moving vehicle, characterized in that to calculate the profile of said state, i.e. the temporal behaviour of the state during a time interval, an auxiliary reference system is also used, that coincides, at the initial time of said time interval, with the reference system fixed with respect to the vehicle.

4. Method as in claim 2 to estimate the state of a moving vehicle, characterized in that the result of the processing of the images, composed of a set of pixel tracks, where each pixel track describes the apparent motion of a characteristic point of the terrain in the sequence of the images, is further processed in order to obtain a set (TP) of tracks of unit vectors, where each unit vector track, (KI), is a function of time and describes the motion of said characteristic point in a reference frame fixed with respect to the ground.

5. Method as in claim 2 to estimate the state of a moving vehicle, characterized in that, to calculate the unit vector, (U), indicating the direction of the displacement of the vehicle between two time instants, the following operations are performed:

the set of tracks, (TP), obtained by processing the images and the measurements of the inertial measurement unit is processed to define at first a set of planes in space, all containing, in case of no measurement errors, the said unit vector (U), and then to define a set of unit vectors, (E), orthogonal to the said set of planes, and the unit vector closer to the perpendicular to the said set of vectors (E) is calculated, analytically minimizing the sum of the squares of the scalar products with the vectors of said set.

6. Method as in claim 2 to estimate the state of a moving vehicle, characterized in that, to calculate the ratio, (RHO), between the lengths of the displacements of the vehicle respectively in the timeframe from (TA) to (TM) and in the timeframe from (TM) to (TB), where (TA), (TM) and (TB) are three successive time instants for which at least one pixel track exists (KI) that starts at (TA) or before, and ends at (TB) of after, the following operations are performed:

the directions (UA) and (UB) of the displacements of the vehicle respectively between time (TA) and (TM), and between (TM) and (TB) are calculated;

two triangles, (TRA) and (TRB), are defined having respectively the following vertices: a) the position of the vehicle at time (TA), the position of the vehicle at time (TM), and the point of the terrain tracked in the said pixel track (KI), and b) the position of the vehicle at time (TM), the position of the vehicle at time (TB), and the point of the terrain tracked in the said pixel track (KI);

the set of tracks, (TP), obtained by processing the images and the measurements of the inertial measurement unit, is used together with the vectors (UA) and (UB), to calculate the angles of said triangles (TRA) and (TRB);

the said ratio, (RHO), between the lengths of the displacements, is calculated, by using the said angles of the triangles (TRA) and (TRA), and applying the triangle law of sines; multiple estimates of (RHO) can be combined.

7. Method as in claim 2 to estimate the state of a moving vehicle, characterized in that, to calculate the velocity of the vehicle in a given time instant (TA), and the gravity acceleration vector, the following operations are performed:

other two time instants, (TM) and (TB), are used to calculate the said unit vectors (UA) and (UB) and the ratio (RHO);

the values calculated at the previous step are used, together with the measurements of the inertial measurement unit, conveniently processed, to calculate the vector (DELTA_R) representing the displacement of the vehicle from (TA) to (TM);

if the gravity acceleration vector is not known, but only its norm is known, then from the said vector (DELTA_R), and from the value of the gravity acceleration norm, and from other values previously obtained, the gravity acceleration vector is determined;

from said gravity acceleration vector, and from others values previously obtained, the velocity at the time instant (TA) is calculated.

8. Method as in claim 2 to estimate the state of a moving vehicle, characterized in that, using also the measurements of an altimeter, then the displacement, (DELTA_R), between two time instants, is calculated by performing the following operations:

the direction, (U), of the said displacement vector is calculated;

the measurements of the altimeter are used to calculate the projection of the said displacement vector along the direction of the measurement of the altimeter;

the values of the said direction (U), of the said direction of measurement of the altimeter, and of the said projection are used to calculate the length of the said displacement (DELTA_R).

9. Method as in claim 2 to estimate the state of a moving vehicle, characterized in that, having available also the measurements of a LIDAR sensor, of the scanning type or flash type, then the displacement, (DELTA_R), between two time instants is calculated by performing the following operations:

the direction, (U), of the said displacement vector is calculated using the following method:

the set of tracks, (TP), obtained by processing the images and the measurements of the inertial measurement unit is processed to define at first a set of planes in space, all containing, in case of no measurement errors, the said unit vector (U), and then to define a set of unit vectors, (E), orthogonal to the said set of planes, and the unit vector closer to the perpendicular to the said set of vectors (E) is calculated, analytically minimizing the sum of the squares of the scalar products with the vectors of said set;

using said direction, the length of said displacement is determined by maximizing the overlapping between the points of the terrain measured with the LIDAR scans in the said two time instants.

10. Method as in claim 2 to estimate the state of a moving vehicle, characterized in that, using as input data also a map of the observed terrain, including also an orthoimage, i.e. a pixel matrix, referred to a planeto-centric reference system, showing the aspect of the observed terrain, then the following operations are performed to calculate the profile of the state of the vehicle in the said reference system:

a comparison is done between the said orthoimage and the images observed by the vehicle, to obtain a set of points of the terrain, where for each point of said set, both the planetocentric coordinates and the coordinates giving the apparent position of the point on one or more of the acquired images are available;

for each of said images, a processing of the coordinates of said points on the image is performed, to obtain a set of unit vectors which give the directions of the position of said points with respect to the vehicle, in the said planetocentric reference frame;

the position of the vehicle in the said planetocentric reference system is calculated, defining a half line for each pair of said point and unit vector, and then defining a function that, for each point in the three-dimensional space, calculates the sum of the squared distances between said point in space and the half lines previously defined, and finally minimizes the said function calculating, with an analytical method, the point for which the gradient of said function is null.

* * * * *

UNITED STATES PATENT AND TRADEMARK OFFICE
CERTIFICATE OF CORRECTION

| | |
|---|---|
| PATENT NO. | : 8,886,366 B2 |
| APPLICATION NO. | : 13/784222 |
| DATED | : November 11, 2014 |
| INVENTOR(S) | : Igor Vukman |

It is certified that error appears in the above-identified patent and that said Letters Patent is hereby corrected as shown below:

On the Title Page

Item (73) Assignee should read: CGS S.P.A. Compagnia Generale Per Lo Spazio, Milan, IT Signed and Sealed this
Tenth Day of March, 2015

Michelle K. Lee
*Deputy Director of the United States Patent and Trademark Office*